United States Patent
Chang et al.

(10) Patent No.: US 8,385,172 B2
(45) Date of Patent: Feb. 26, 2013

(54) METHOD FOR RECORDING CRITICAL PATTERNS WITH DIFFERENT MARK LENGTHS ONTO OPTICAL STORAGE MEDIUM AND RELATED CONTROLLER THEREOF

(75) Inventors: You-Wen Chang, Hsinchu (TW); Yi-Sung Chan, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/184,566

(22) Filed: Jul. 17, 2011

(65) Prior Publication Data

US 2012/0039157 A1  Feb. 16, 2012

Related U.S. Application Data

(60) Provisional application No. 61/373,251, filed on Aug. 12, 2010.

(51) Int. Cl.
*G11B 7/00* (2006.01)
(52) U.S. Cl. .................................................. 369/59.11
(58) Field of Classification Search ............... 369/59.11, 369/59.12, 116, 47.5–47.53, 53.26
See application file for complete search history.

(56) References Cited

U.S. PATENT DOCUMENTS

| | | | | |
|---|---|---|---|---|
| 5,327,411 | A | * | 7/1994 | Iwasa et al. ............... 369/59.12 |
| 5,384,781 | A | | 1/1995 | Kawabata |
| 5,732,062 | A | * | 3/1998 | Yokoi et al. ................... 369/116 |
| 2001/0053115 | A1 | * | 12/2001 | Nobukuni et al. ......... 369/59.12 |
| 2009/0310458 | A1 | * | 12/2009 | Nishimura et al. ........ 369/59.11 |
| 2010/0260029 | A1 | * | 10/2010 | Kurihara et al. ............. 369/100 |

OTHER PUBLICATIONS

You-Wen Chang et al., Title of Invention: Calibration Apparatus for Performing Phase Detection/Edge Distance Detection Upon Signals and Related Calibration Method Thereof, U.S. Appl. No. 13/280,341, filed Oct. 25, 2011.

* cited by examiner

*Primary Examiner* — Thang Tran
(74) *Attorney, Agent, or Firm* — Winston Hsu; Scott Margo

(57) ABSTRACT

An exemplary method for recording a first mark with a first length and a second mark with a second length onto an optical storage medium includes: when recording of the first mark requires a power transition from a first laser power level to a second laser power level, making a specific control signal have a logic transition from a low logic value to a high logic value and other control signals have no logic transition; and when recording of the second mark requires a power transition from a third laser power level to a fourth laser power level, making the specific control signal have the logic transition from the low logic value to the high logic value and other control signals have no logic transition.

18 Claims, 9 Drawing Sheets

METHOD FOR RECORDING CRITICAL PATTERNS WITH DIFFERENT MARK LENGTHS ONTO OPTICAL STORAGE MEDIUM AND RELATED CONTROLLER THEREOF

CROSS REFERENCE TO RELATED APPLICATIONS

This application claims the benefit of U.S. provisional application No. 61/373,251, filed on Aug. 12, 2010 and incorporated herein by reference.

BACKGROUND

The disclosed embodiments of the present invention relate to recording data onto an optical storage medium, and more particularly, to a method for recording critical patterns with different mark lengths onto an optical storage medium (e.g., an optical disc) and related controller thereof.

Data patterns recorded onto an optical storage medium may be simply categorized into marks each representative of a series of 1's and spaces each representative of a series of 0's. In general, the recording of a mark requires higher laser power levels, whereas the recording of a space requires lower laser power levels. For example, the optical storage medium may be recorded using a plurality of laser power levels, such as a peak laser power level Ppeak, a middle laser power level Pmiddle, a space laser power level Pspace, and a bottom laser power level Pbottom. It should be noted that Ppeak>Pmiddle>Pspace>Pbottom. The power transition from one of the laser power levels to another of the laser power levels may affect the formation of a mark on the optical storage medium. For example, the power transition from a lower laser power level to the peak laser power level Ppeak (i.e., the highest laser power level) for the first time after the laser power is lately lowered to the bottom laser power level Pbottom (i.e., the lowest laser power level) and the power transition from a higher laser power level to the bottom laser power level Pbottom (i.e., the lowest laser power level) for the first time after the laser power is lately raised to the peak laser power level Ppeak (i.e., the highest laser power level) are critical to form a mark on the optical storage medium. Thus, the timing of these critical power transitions may dominate the accuracy of the length of the mark formed on the optical storage medium.

An optical pick-up unit (OPU) is used for generating a laser beam with a desired laser power level for recording data patterns, including marks and spaces, onto an optical storage medium. In general, the optical pick-up unit is coupled to a controller chip via an interface disposed therebetween. The controller chip is configured to generate control signals, such as one or more sets of write enable (WEN) signals, to the OPU for setting the laser power level used by the OPU. Regarding a conventional controller chip design, the recording of a first mark (e.g., a 2T mark) and the recording of a second mark (e.g., a 3T mark) may employ different control signals (i.e., different WEN signals) to enable the laser beam radiated from the OPU to have the power transition from a lower laser power level to the peak laser power level Ppeak (i.e., the highest laser power level) for the first time after the laser power is lately lowered to the bottom laser power level Pbottom (i.e., the lowest laser power level). Further, the recording of the first mark (e.g., a 2T mark) and the recording of the second mark (e.g., a 3T mark) may employ different control signals (i.e., different WEN signals) to enable the laser beam radiated from the OPU to have the power transition from a higher laser power level to the bottom laser power level Pbottom (i.e., the lowest laser power level) for the first time after the laser power is lately raised to the peak laser power level Ppeak (i.e., the highest laser power level). In a case where there are non-ideal effects present at the controller chip, the OPU, and/or the interface between the controller chip and the OPU, the difference between actual lengths of the first mark and the second mark formed on the optical storage medium may be significantly deviated from an expected value, which results in degradation of the recording quality.

SUMMARY

In accordance with exemplary embodiments of the present invention, a method for recording critical patterns with different mark lengths onto an optical storage medium (e.g., an optical disc) and related controller thereof are proposed to solve the above-mentioned problems.

According to a first aspect of the present invention, an exemplary method for recording a first mark with a first length and a second mark with a second length onto an optical storage medium is disclosed. The exemplary method includes: when recording of the first mark requires a power transition from a first laser power level to a second laser power level, making a specific control signal have a logic transition from a low logic value to a high logic value and other control signals have no logic transition; and when recording of the second mark requires a power transition from a third laser power level to a fourth laser power level, making the specific control signal have the logic transition from the low logic value to the high logic value and other control signals have no logic transition.

According to a second aspect of the present invention, an exemplary method for recording a first mark with a first length and a second mark with a second length onto an optical storage medium is disclosed. The exemplary method includes: when recording of the first mark requires a power transition from a first laser power level to a second laser power level, making a specific control signal have a logic transition from a low logic value to a high logic value and other control signals have no logic transition; and when recording of the second mark requires a power transition from a third laser power level to a fourth laser power level, making the specific control signal have the logic transition from the high logic value to the low logic value and other control signals have no logic transition.

According to a third aspect of the present invention, an exemplary controller for controlling an optical pick-up unit to record a first mark with a first length and a second mark with a second length onto an optical storage medium is disclosed. The exemplary controller includes a checking circuit and a processing circuit. The checking circuit is arranged for checking if recording of the first mark requires a power transition from a first laser power level to a second laser power level and checking if recording of the second mark requires a power transition from a third laser power level to a fourth laser power level. The processing circuit is coupled to the checking circuit, and arranged for making a specific control signal transmitted to the optical pick-up unit have a logic transition from a low logic value to a high logic value and other control signals transmitted to the optical pick-up unit have no logic transition when the checking circuit indicates that the recording of the first mark requires the power transition from the first laser power level to the second laser power level, and making the specific control signal transmitted to the optical pick-up unit have the logic transition from the low logic value to the high logic value and other control signals transmitted to the optical pick-up unit have no logic transition when the checking circuit indicates that the recording of the second mark requires the power transition from the third laser power level to the fourth laser power level.

According to a fourth aspect of the present invention, an exemplary controller for controlling an optical pick-up unit to record a first mark with a first length and a second mark with a second length onto an optical storage medium is disclosed. The exemplary controller includes a checking circuit and a processing circuit. The checking circuit is arranged for checking if recording of the first mark requires a power transition from a first laser power level to a second laser power level, and checking if recording of the second mark requires a power transition from a third laser power level to a fourth laser power level. The processing circuit is coupled to the checking circuit, and arranged for making a specific control signal transmitted to the optical pick-up unit have a logic transition from a low logic value to a high logic value and other control signals transmitted to the optical pick-up unit have no logic transition when the checking circuit indicates that the recording of the first mark requires the power transition from the first laser power level to the second laser power level, and making the specific control signal transmitted to the optical pick-up unit have the logic transition from the high logic value to the low logic value and other control signals transmitted to the optical pick-up unit have no logic transition when the checking circuit indicates that the recording of the second mark requires the power transition from the third laser power level to the fourth laser power level.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
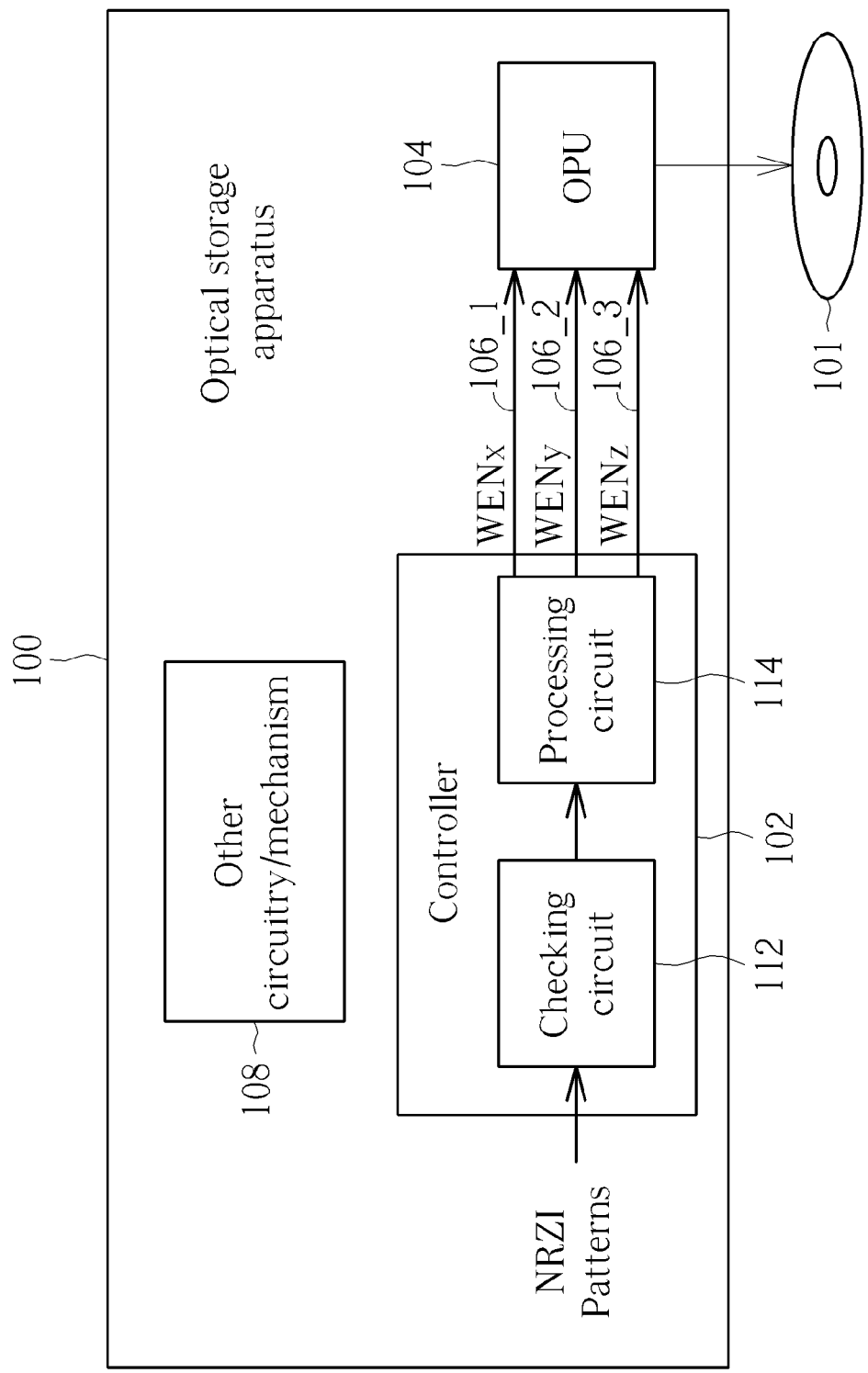
FIG. 1 is a diagram illustrating a block diagram of an optical storage apparatus according to an exemplary embodiment of the present invention.

Please refer to FIG. 1, which is a diagram illustrating a block diagram of an optical storage apparatus according to an exemplary embodiment of the present invention. The optical storage apparatus 100 may be an optical disc drive, and includes a controller (e.g., a controller chip) 102, an optical pick-up unit (OPU) 104, a plurality of transmission lines 106_1, 106_2, and 106_3 coupled between the controller 102 and the OPU 104, and other circuitry/mechanism 108 required for realizing designated functionality of the optical storage apparatus 100. As the present invention focuses on the control scheme of the laser power, further description directed to other circuitry/mechanism 108 is omitted here for brevity. The OPU 104 is arranged for generating a laser beam with a desired laser power level upon an optical storage medium (e.g., an optical disc) 101 for recording data patterns, including marks and spaces, onto the optical storage medium 101.

The controller 102 is arranged for controlling the OPU 104 to set the laser power level of the laser beam radiated from the OPU 104. In this exemplary embodiment, the controller 102 communicates with the OPU 104 via an interface including the transmission lines 106_1-106_3, where the transmission lines 106_1-106_3 are used for transmitting control signals, such as WEN signals WENx, WENy, and WENz, from the controller 102 to the OPU 104. Upon receiving the control signals WENx, WENy, and WENz generated from the controller 102, the OPU 104 sets/changes the laser power correspondingly. By way of example, but not limitation, the setting of control signals WENx, WENy, and WENz may follow a gray code rule when a high-speed recording operation is enabled, thus allowing only one of the control signals WENx, WENy, and WENz to have a logic transition from one logic level to another logic level at any moment. However, this is for illustrative purposes only, and is not meant to be a limitation to the scope of the present invention. Moreover, the number of employed transmission lines is not limited to three. That is, the number of employed transmission lines may be adjusted, depending upon actual design consideration/requirement.

As shown in FIG. 1, the controller 102 includes, but is not limited to, a checking circuit 112 and a processing circuit 114. The checking circuit 112 is arranged for checking the incoming data to be recorded, such as non return to zero, inverted (NRZI) patterns, and determining if marks to be recorded onto the optical storage medium 101 belong to critical patterns (e.g., a 2T mark and a 3T mark for a Blu-ray disc, or a 3T mark and a 4T mark for a digital versatile disc/compact disc). In a case where a first mark and a second mark are identified as critical patterns, the checking circuit 112 is operative to check if recording of the first mark requires at least one critical power transition from a first laser power level to a second laser power level and also check if recording of the second mark requires at least one critical power transition from a third laser power level to a fourth laser power level. It should be noted that a critical power transition may be a transition from a lower laser power level to a higher laser power level or a transition from a higher laser power level to a lower laser power level. Besides, in accordance with actual write strategy design, when the critical power transitions are both power increment cases or power decrement cases, the first laser power level may be identical to or different from the third laser power level, and/or the second laser power level may be identical to or different from the fourth laser power level.

The processing circuit 114 is coupled to the checking circuit 112 and the transmission lines 106_1-106_3, and arranged for making a specific control signal (e.g., WENy) transmitted to the OPU 104 via a specific transmission line (e.g., 106_2) have a logic transition from one logic value to another value and other control signals (e.g., WENx and WENz) transmitted to the OPU 104 via remaining transmission lines (e.g., 106_1 and 106_3) have no logic transition (i.e., unchanged) when the checking circuit 112 indicates that the recording of the first mark requires the critical power transition from the first laser power level to the second laser power level (e.g., the critical power transition is a power increment case (or power decrement case)), and making the control signal (e.g., WENy) transmitted to the OPU 104 via the same specific transmission line (e.g., 106_2) have a logic transition from one logic value to another logic value and other control signals (e.g., WENx and WENz) transmitted to the OPU 104 via the same remaining transmission lines (e.g., 106_1 and 106_3) have no logic transition (i.e., unchanged) when the checking circuit 112 indicates that the recording of the second mark requires the critical power transition from the third laser power level to the fourth laser power level (e.g., the critical power transition is also the power increment case (or the power decrement case)).

As the critical power transitions, either power increment cases or power decrement cases, required by the recording of the first mark and second mark are controlled by the same control signal (e.g., WENy) transmitted by the same transmission line (e.g., 102_2), the non-ideal effects present at the controller 102, the OPU 104, and/or the interface between the controller 102 and the OPU 104 may be mitigated or avoided. Thus, compared to the conventional controller design, the exemplary controller design of the present invention is capable of making the difference between actual lengths of the first mark and the second mark formed on the optical storage medium 101 close to or identical to an expected value, leading to improved recording quality. Further details will be described hereinafter.

Figure 2:
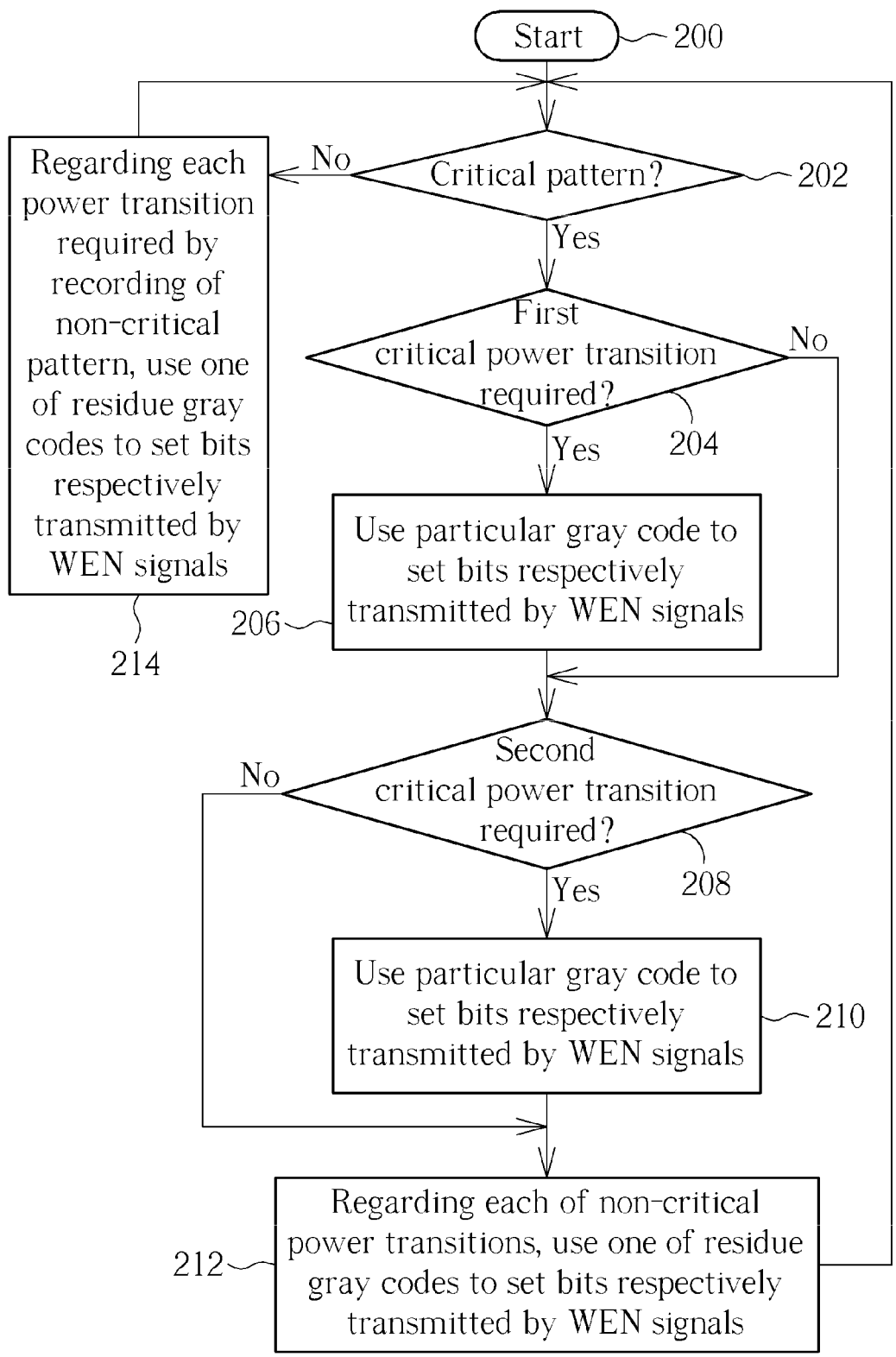
FIG. 2 is a flowchart illustrating a method for recording data patterns, including marks and spaces, onto an optical storage medium according to an exemplary embodiment of the present invention.

Please refer to FIG. 2, which is a flowchart illustrating a method for recording data patterns, including marks and spaces, onto an optical storage medium according to an exemplary embodiment of the present invention. Provided that the result is substantially the same, the steps are not required to be executed in the exact order shown in FIG. 2. The exemplary method may be briefly summarized as below.

Step 200: Start.

Step 202: Check if an incoming NRZI pattern is one of pre-defined critical patterns. If yes, go to step 204; otherwise, go to step 214.

Step 204: Check if recording of the critical pattern requires a first critical power transition (e.g., a power increment case) from one laser power level to another laser power level. If yes, go to step 206; otherwise, go to step 208.

Step 206: Regarding the first critical power transition, use a particular gray code to set bits respectively transmitted by the control signals WENx, WENy, and WENz, such that a selected control signal transmitted to the OPU 104 via a selected transmission line has a logic transition from one logic value to another logic value and other control signals transmitted to the OPU 104 via remaining transmission lines have no logic transition.

Step 208: Check if recording of the critical pattern requires a second critical power transition (e.g., a power decrement case) from one laser power level to another laser power level. If yes, go to step 210; otherwise, go to step 212.

Step 210: Regarding the second critical power transition, use a particular gray code to set bits respectively transmitted by the control signals WENx, WENy, and WENz, such that a selected control signal transmitted to the OPU 104 via a selected transmission line has a logic transition from one logic value to another logic value and other control signals transmitted to the OPU 104 via remaining transmission lines have no logic transition.

Step 212: Regarding each of the non-critical power transitions, use one of residue gray codes to set bits respectively transmitted by the control signals WENx, WENy, and WENz. Go to step 202 to check the next NRZI pattern.

Step 214: Regarding each of the power transitions required by recording of the non-critical pattern, use one of residue gray codes to set bits respectively transmitted by the control signals WENx, WENy, and WENz. Go to step 202 to check the next NRZI pattern.

Steps 202, 204, and 208 may be executed by the checking circuit 112, and steps 206, 210, 212, and 214 may be executed by the processing circuit 114.

The above-mentioned critical patterns may have different definitions under different operational scenarios. For example, when the optical storage medium 101 is a Blu-ray disc, critical patterns monitored by the checking circuit 112 may include a 2T mark and a 3T mark. When the optical storage medium 101 is a digital versatile disc/compact disc, critical patterns monitored by the checking circuit 112 may include a 3T mark and a 4T mark. Thus, in one exemplary design, a first mark and a second mark identified as critical patterns may have a first length and a second length are successive mark lengths. In another exemplary design, one of the first length and the second length may be a shortest mark length allowed by the optical storage medium 101.

Besides, the above-mentioned critical power transitions, logic transitions, and/or particular gray codes may also have different definitions under different operational scenarios. Certain examples are given as below for further illustration.

Figure 3:
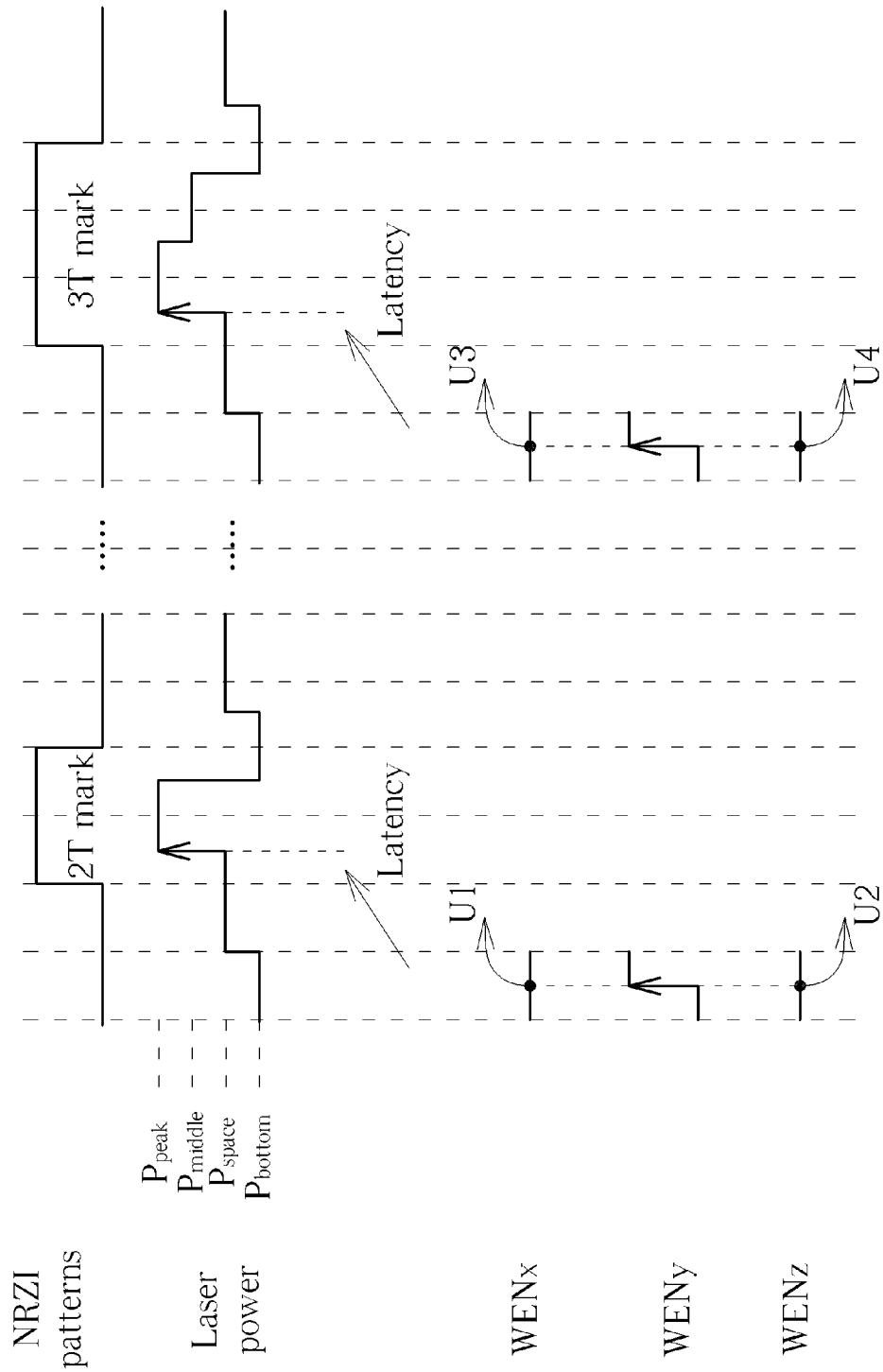
FIG. 3 is a diagram illustrating a first exemplary design of setting control signals for critical power transitions required by recording of a first mark and a second mark that are identified as critical patterns.

Please refer to FIG. 3, which is a diagram illustrating a first exemplary design of setting control signals WENx, WENy, and WENz for critical power transitions required by recording of a first mark and a second mark that are identified as critical patterns. In this exemplary design, one of the first mark and second mark is a 2T mark, and the other of the first mark and second mark is a 3T mark. Besides, the optical storage medium 101 is recorded using a plurality of laser power levels $P_{peak}$, $P_{middle}$, $P_{space}$, and $P_{bottom}$ including a highest laser power level (i.e., $P_{peak}$) and a lowest laser power level (i.e., $P_{bottom}$). Regarding the recording of the 2T mark, one critical power transition from a first laser power level to a second laser power level is a power increment case defined to have the second laser power level being the highest laser power level (i.e., $P_{peak}$) firstly used after the latest lowest laser power level (i.e., $P_{bottom}$) is used. Similarly, regarding the recording of the 3T mark, one critical power transition from a third laser power level to a fourth laser power level is a power increment case defined to have the fourth laser power level being the highest laser power level (i.e., $P_{peak}$) firstly used after the latest lowest laser power level (i.e., $P_{bottom}$) is used.

Therefore, the processing circuit 114 makes the control signal WENy transmitted to the OPU 104 via the transmission line 106_2 have a logic transition from a low logic value (i.e., "0") to a high logic value (i.e., "1") and other control signals WENx and WENz transmitted to the OPU 104 via remaining transmission lines 106_1 and 106_3 have no logic transition (i.e., unchanged) when the checking circuit 112 indicates that the recording of the 2T mark requires the power transition from the laser power level $P_{space}$ to the laser power level $P_{peak}$, and makes the control signal WENy transmitted to the OPU 104 via the same transmission line 106_2 have the logic transition from the low logic value (i.e., "0") to the high logic value (i.e., "1") and other control signals WENx and WENz transmitted to the OPU 104 via the remaining transmission lines 106_1 and 106_3 have no logic transition (i.e., unchanged) when the checking circuit 112 indicates that the recording of the 3T mark requires the power transition from the laser power level $P_{space}$ to the laser power level $P_{peak}$.

Regarding the recording of the 2T mark, there is latency (i.e., delay time) between the timing of the logic transition set by the processing circuit 114 and the timing of the power transition set by the OPU 104 due to transmission and processing of the control signals WENx-WENz. Similarly, regarding the recording of the 3T mark, there is latency (i.e., delay time) between the timing of the logic transition set by the processing circuit 114 and the timing of the power transition set by the OPU 104 due to transmission and processing of the control signals WENx-WENz.

As can be seen from FIG. 3, the logic levels at points U1, U2, U3, and U4 are unchanged. In other words, when an original logic level at the transmission line 106_1 is "0" just before the timing of the logic transition at the transmission line 106_2, the logic level at the transmission line 106_1 is kept at "0" just after the timing of the logic transition at the transmission line 106_2; and when an original logic level at the transmission line 106_1 is "1" just before the timing of the logic transition at the transmission line 106_2, the logic level at the transmission line 106_1 is kept at "1" just after the timing of the logic transition at the transmission line 106_2. Similarly, when an original logic level at the transmission line 106_3 is "0" just before the timing of the logic transition at the transmission line 106_2, the logic level at the transmission line 106_3 is kept at "0" just after the timing of the logic transition at the transmission line 106_2; and when an original logic level at the transmission line 106_3 is "1" just before the timing of the logic transition at the transmission line 106_2, the logic level at the transmission line 106_3 is kept at "1" just after the timing of the logic transition at the transmission line 106_2.

As shown in FIG. 3, the power difference between laser power levels $P_{peak}$ and $P_{space}$ is the largest power transition from a lower laser power level to a higher laser power level. Alternatively, during the recording of the 2T mark, one critical power transition from a first laser power level to a second laser power level may be a power increment case defined to have a power difference greater than any other power transition from a lower laser power level to a higher laser power level; and during the recording of the 3T mark, one critical power transition from a third laser power level to a fourth laser power level may be a power increment case defined to have a power difference greater than any other power transition from a lower laser power level to a higher laser power level. This also obeys the spirit of the present invention and falls within the scope of the present invention.

Figure 4:
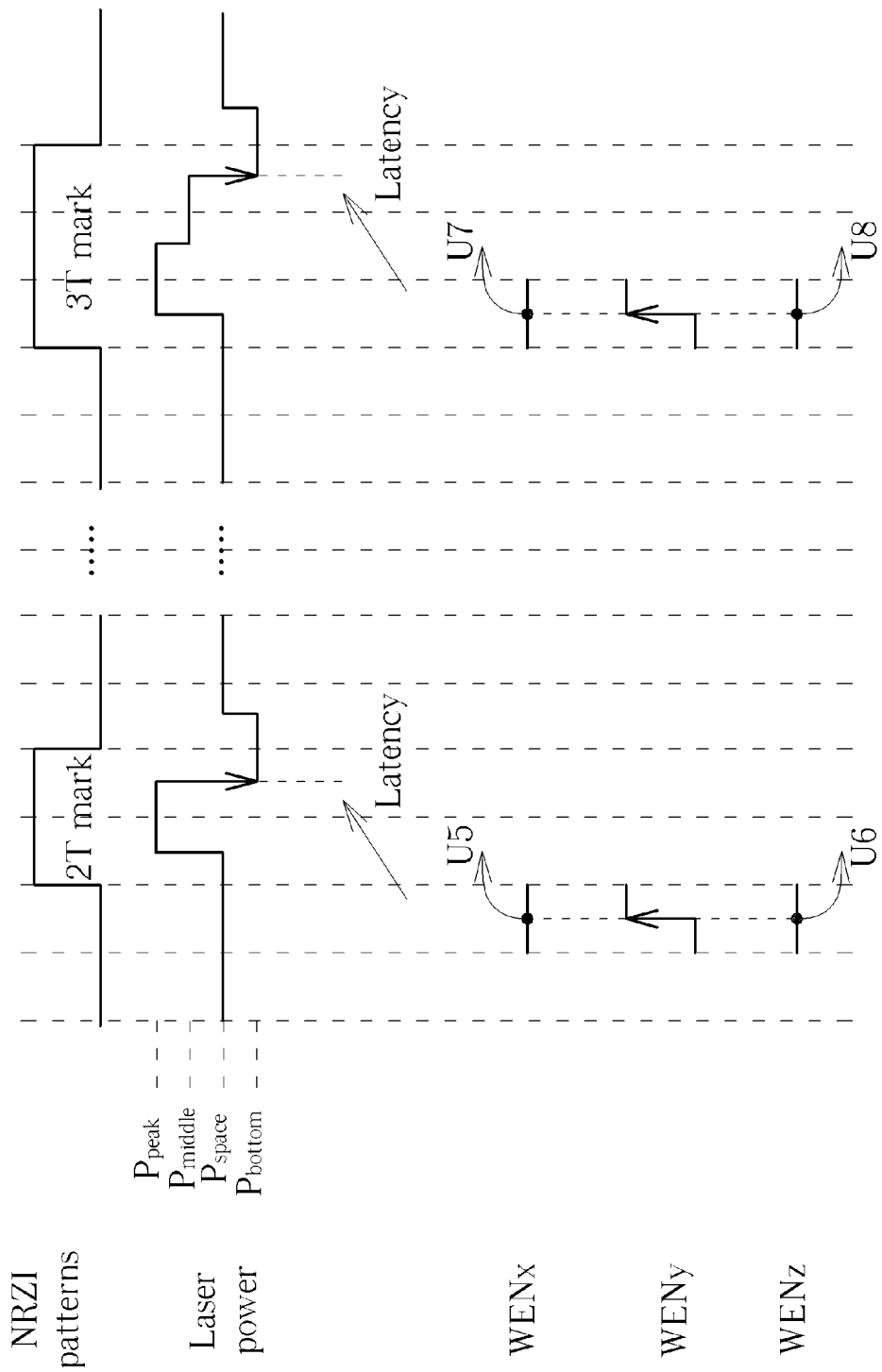
FIG. 4 is a diagram illustrating a second exemplary design of setting control signals for critical power transitions required by recording of a first mark and a second mark that are identified as critical patterns.

Please refer to FIG. 4, which is a diagram illustrating a second exemplary design of setting control signals WENx, WENy, and WENz for critical power transitions required by recording of a first mark and a second mark that are identified as critical patterns. In this exemplary design, one of the first mark and second mark is a 2T mark, and the other of the first mark and second mark is a 3T mark. Besides, the optical storage medium 101 is recorded using a plurality of laser power levels $P_{peak}$, $P_{middle}$, $P_{space}$, and $P_{bottom}$ including a highest laser power level (i.e., $P_{peak}$,) and a lowest laser power level (i.e., $P_{bottom}$). Regarding the recording of the 2T mark, one critical power transition from a first laser power level to a second laser power level is a power decrement case defined to have the second laser power level being the lowest laser power level (i.e., $P_{bottom}$) firstly used after the latest highest laser power level (i.e., $P_{peak}$) is used. Similarly, regarding the recording of the 3T mark, one critical power transition from a third laser power level to a fourth laser power level is a power decrement case defined to have the fourth laser power level being the lowest laser power level (i.e., $P_{bottom}$) firstly used after the latest highest laser power level (i.e., $P_{peak}$ is used.

Therefore, the processing circuit 114 makes the control signal WENy transmitted to the OPU 104 via the transmission line 106_2 have a logic transition from a low logic value (i.e., "0") to a high logic value (i.e., "1") and other control signals WENx and WENz transmitted to the OPU 104 via remaining transmission lines 106_1 and 106_3 have no logic transition (i.e., unchanged) when the checking circuit 112 indicates that the recording of the 2T mark requires the power transition from the laser power level $P_{peak}$ to the laser power level $P_{bottom}$, and makes the control signal WENy transmitted to the OPU 104 via the same transmission line 106_2 have the logic transition from the low logic value (i.e., "0") to the high logic value (i.e., "1") and other control signals WENx and WENz transmitted to the OPU 104 via the remaining transmission lines 106_1 and 106_3 have no logic transition (i.e., unchanged) when the checking circuit 112 indicates that the recording of the 3T mark requires the power transition from the laser power level $P_{middle}$ to the laser power level $P_{bottom}$.

Regarding the recording of the 2T mark, there is latency (i.e., delay time) between the timing of the logic transition set by the processing circuit 114 and the timing of the power transition set by the OPU 104 due to transmission and processing of the control signals WENx-WENz. Similarly, regarding the recording of the 3T mark, there is latency (i.e., delay time) between the timing of the logic transition set by the processing circuit 114 and the timing of the power transition set by the OPU 104 due to transmission and processing of the control signals WENx-WENz.

As can be seen from FIG. 4, the logic levels at points U5, U6, U7, and U8 are unchanged. In other words, when an original logic level at the transmission line 106_1 is "0" just before the timing of the logic transition at the transmission line 106_2, the logic level at the transmission line 106_1 is kept at "0" just after the timing of the logic transition at the transmission line 106_2; and when an original logic level at the transmission line 106_1 is "1" just before the timing of the logic transition at the transmission line 106_2, the logic level at the transmission line 106_1 is kept at "1" just after the timing of the logic transition at the transmission line 106_2. Similarly, when an original logic level at the transmission line 106_3 is "0" just before the timing of the logic transition at the transmission line 106_2, the logic level at the transmission line 106_3 is kept at "0" just after the timing of the logic transition at the transmission line 106_2; and when an original logic level at the transmission line 106_3 is "1" just before the timing of the logic transition at the transmission line 106_2, the logic level at the transmission line 106_3 is kept at "1" just after the timing of the logic transition at the transmission line 106_2.

As shown in FIG. 4, the power difference between laser power levels $P_{peak}$ and $P_{bottom}$ is the largest power transition from a higher laser power level to a lower laser power level under the condition where a 2T mark is being recorded, and the power difference between laser power levels $P_{middle}$ and $P_{bottom}$ is the largest power transition from a higher laser power level to a lower laser power level under the condition where a 3T mark is being recorded. Alternatively, during the recording of the 2T mark, one critical power transition from a first laser power level to a second laser power level may be a power decrement case defined to have a power difference greater than any other power transition from a higher laser power level to a lower laser power level; and during the recording of the 3T mark, one critical power transition from a third laser power level to a fourth laser power level may be a power decrement case defined to have a power difference greater than any other power transition from a higher laser power level to a lower laser power level. This also obeys the spirit of the present invention and falls within the scope of the present invention.

In above examples shown in FIG. 3 and FIG. 4, the logic transitions of the control signal WENy are all rising edges for optimum mitigation of the non-ideal effects present at the controller 102, the OPU 104, and/or the interface between the controller 102 and OPU 104. However, the non-ideal effect may be mitigated as long as the critical power transitions of the critical patterns are controlled by a control signal transmitted via the same transmission line. That is, alternative implementations of the exemplary designs shown in FIG. 3 and FIG. 4 are feasible.

Figure 5:
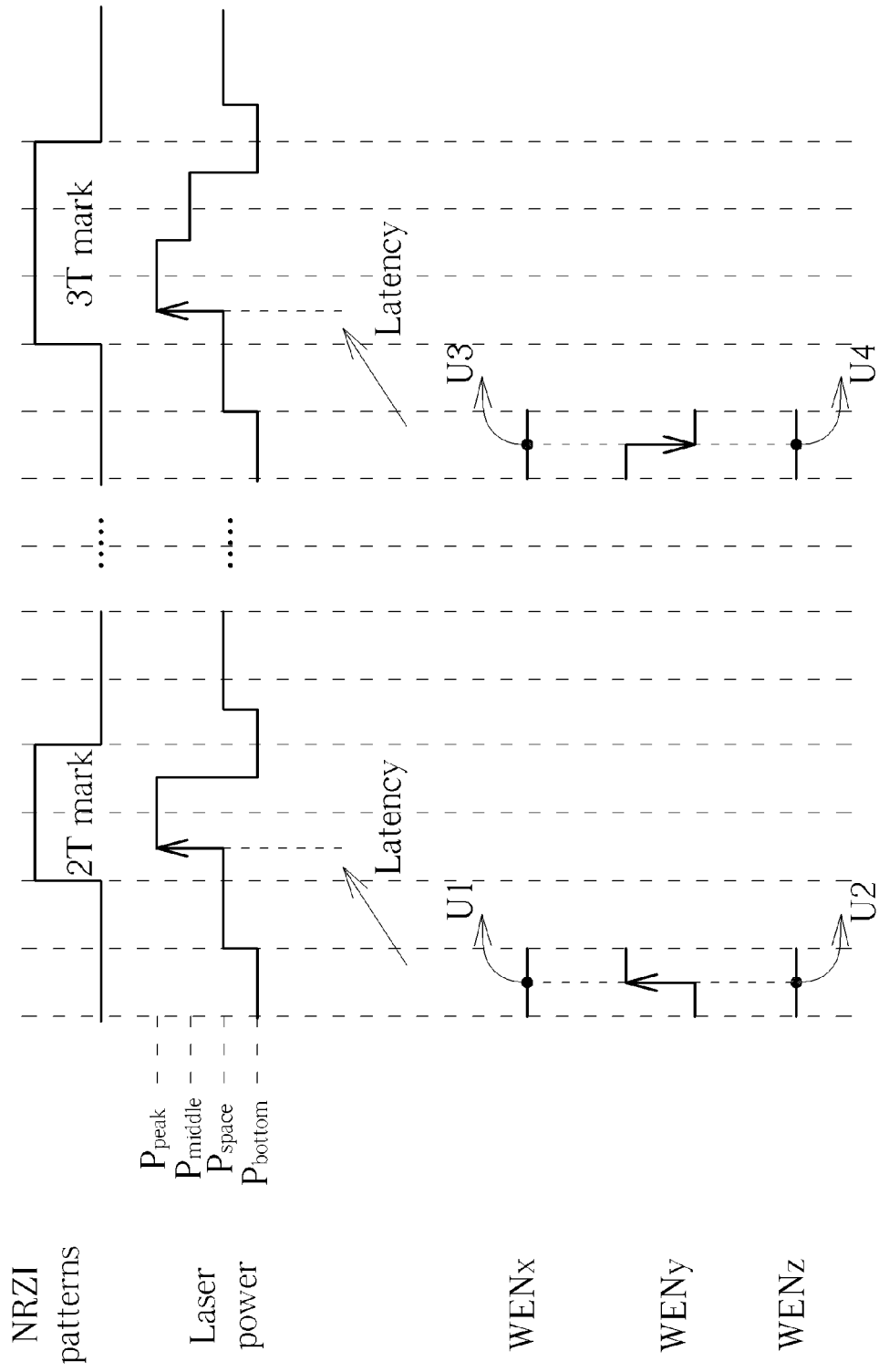
FIG. 5 is a diagram illustrating a first alternative implementation of the exemplary design shown in FIG. 3.

Please refer to FIG. 5 in conjunction with FIG. 3. FIG. 5 is a diagram illustrating a first alternative implementation of the exemplary design shown in FIG. 3. In this exemplary embodiment, the processing circuit 114 makes the control signal WENy transmitted to the OPU 104 via the transmission line 106_2 have a logic transition from a low logic value (i.e., "0") to a high logic value (i.e., "1") and other control signals WENx and WENz transmitted to the OPU 104 via remaining transmission lines 106_1 and 106_3 have no logic transition (i.e., unchanged) when the checking circuit 112 indicates that the recording of the 2T mark requires the power transition from the laser power level $P_{space}$ to the laser power level $P_{peak}$, and makes the control signal WENy transmitted to the OPU 104 via the same transmission line 106_2 have a logic transition from the high logic value (i.e., "1") to the low logic value (i.e., "0") and other control signals WENx and WENz transmitted to the OPU 104 via the remaining transmission lines 106_1 and 106_3 have no logic transition (i.e., unchanged) when the checking circuit 112 indicates that the recording of the 3T mark requires the power transition from the laser power level $P_{space}$ to the laser power level $P_{peak}$.

Figure 6:
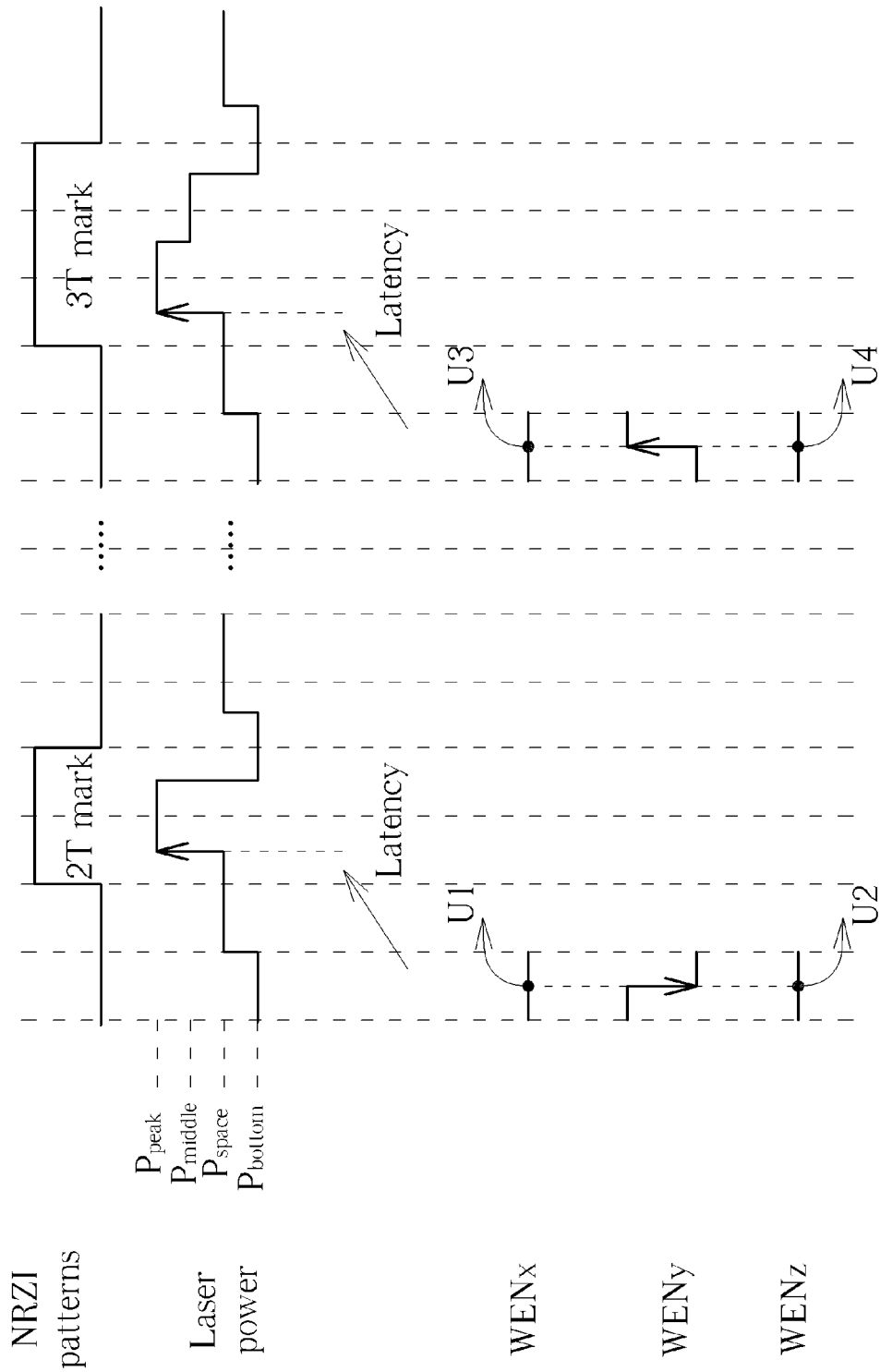
FIG. 6 is a diagram illustrating a second alternative implementation of the exemplary design shown in FIG. 3.

Please refer to FIG. 6 in conjunction with FIG. 3. FIG. 6 is a diagram illustrating a second alternative implementation of the exemplary design shown in FIG. 3. In this exemplary embodiment, the processing circuit 114 makes the control signal WENy transmitted to the OPU 104 via the transmission line 106_2 have a logic transition from a high logic value (i.e., "1") to a low logic value (i.e., "0") and other control signals WENx and WENz transmitted to the OPU 104 via remaining transmission lines 106_1 and 106_3 have no logic transition (i.e., unchanged) when the checking circuit 112 indicates that the recording of the 2T mark requires the power transition from the laser power level $P_{space}$ to the laser power level $P_{peak}$, and makes the control signal WENy transmitted to the OPU 104 via the same transmission line 106_2 have a logic transition from the low logic value (i.e., "0") to the high logic value (i.e., "1") and other control signals WENx and WENz transmitted to the OPU 104 via the remaining transmission lines 106_1 and 106_3 have no logic transition (i.e., unchanged) when the checking circuit 112 indicates that the recording of the 3T mark requires the power transition from the laser power level $P_{space}$ to the laser power level $P_{peak}$.

Figure 7:
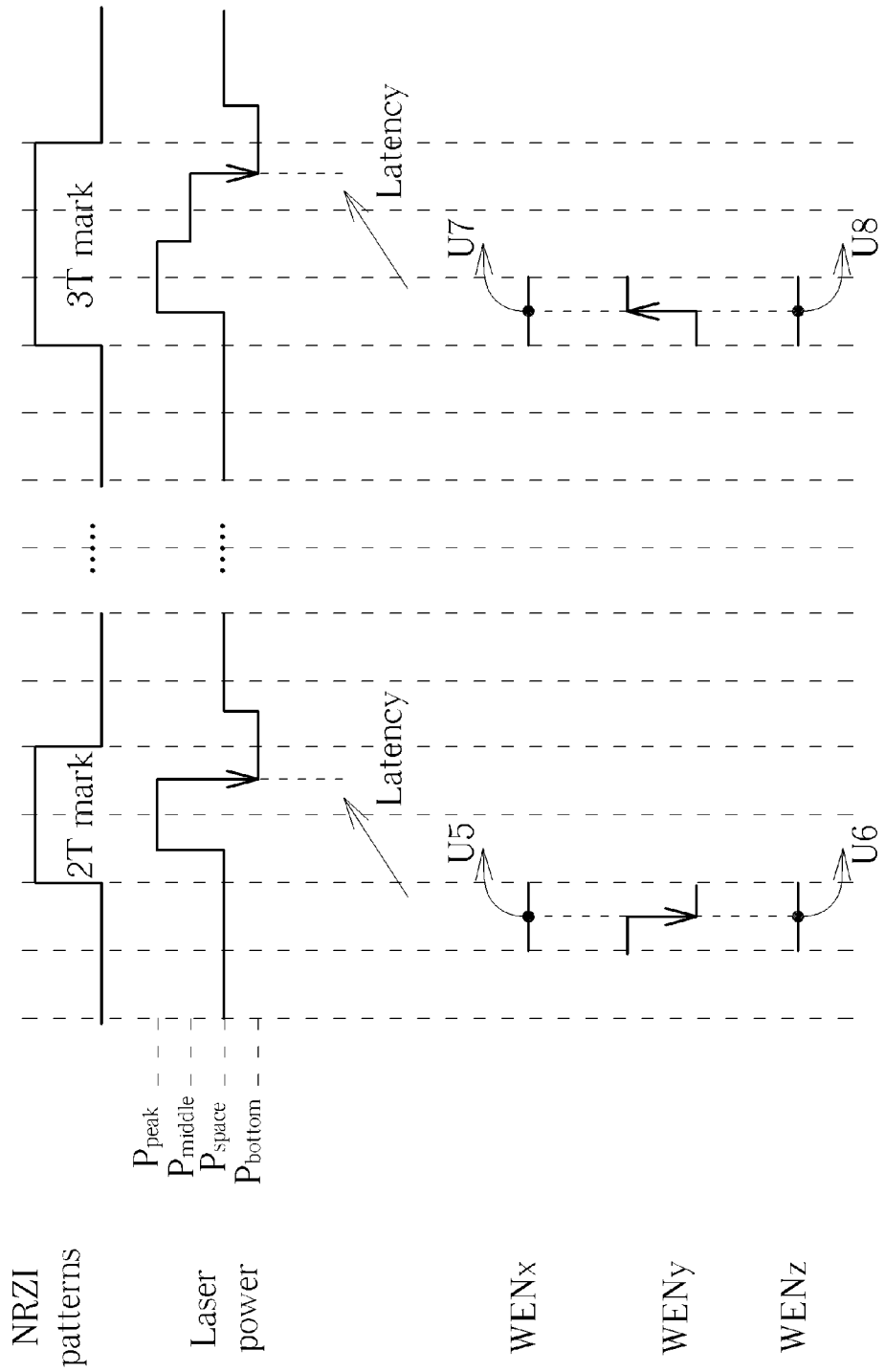
FIG. 7 is a diagram illustrating a first alternative implementation of the exemplary design shown in FIG. 4.

Please refer to FIG. 7 in conjunction with FIG. 4. FIG. 7 is a diagram illustrating a first alternative implementation of the exemplary design shown in FIG. 4. In this exemplary embodiment, the processing circuit 114 makes the control signal WENy transmitted to the OPU 104 via the transmission line 106_2 have a logic transition from a high logic value (i.e., "1") to a low logic value (i.e., "0") and other control signals WENx and WENz transmitted to the OPU 104 via remaining transmission lines 106_1 and 106_3 have no logic transition (i.e., unchanged) when the checking circuit 112 indicates that the recording of the 2T mark requires the power transition from the laser power level $P_{peak}$ to the laser power level $P_{bottom}$, and makes the control signal WENy transmitted to the OPU 104 via the same transmission line 106_2 have a logic transition from the low logic value (i.e., "0") to the high logic value (i.e., "1") and other control signals WENx and WENz transmitted to the OPU 104 via the remaining transmission lines 106_1 and 106_3 have no logic transition (i.e., unchanged) when the checking circuit 112 indicates that the recording of the 3T mark requires the power transition from the laser power level $P_{middle}$ to the laser power level $P_{bottom}$.

Figure 8:
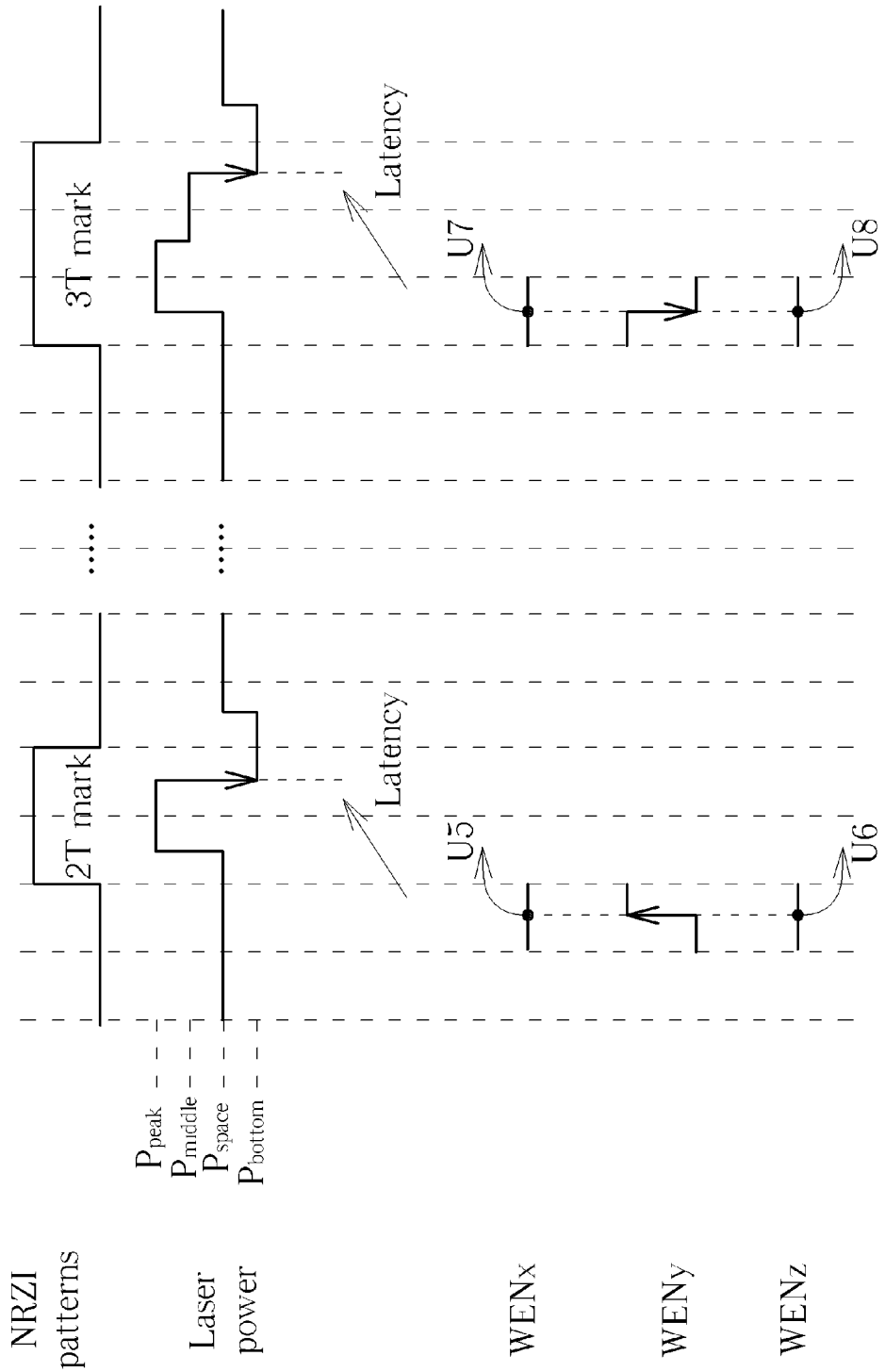
FIG. 8 is a diagram illustrating a second alternative implementation of the exemplary design shown in FIG. 4.

Please refer to FIG. 8 in conjunction with FIG. 4. FIG. 8 is a diagram illustrating a second alternative implementation of the exemplary design shown in FIG. 4. The processing circuit 114 makes the control signal WENy transmitted to the OPU 104 via the transmission line 106_2 have a logic transition from a low logic value (i.e., "0") to a high logic value (i.e., "1") and other control signals WENx and WENz transmitted to the OPU 104 via remaining transmission lines 106_1 and 106_3 have no logic transition (i.e., unchanged) when the checking circuit 112 indicates that the recording of the 2T mark requires the power transition from the laser power level $P_{peak}$ to the laser power level $P_{bottom}$, and makes the control signal WENy transmitted to the OPU 104 via the same transmission line 106_2 have a logic transition from the high logic value (i.e., "1") to the low logic value (i.e., "0") and other control signals WENx and WENz transmitted to the OPU 104 via the remaining transmission lines 106_1 and 106_3 have no logic transition (i.e., unchanged) when the checking circuit 112 indicates that the recording of the 3T mark requires the power transition from the laser power level $P_{middle}$ to the laser power level $P_{bottom}$.

Figure 9:
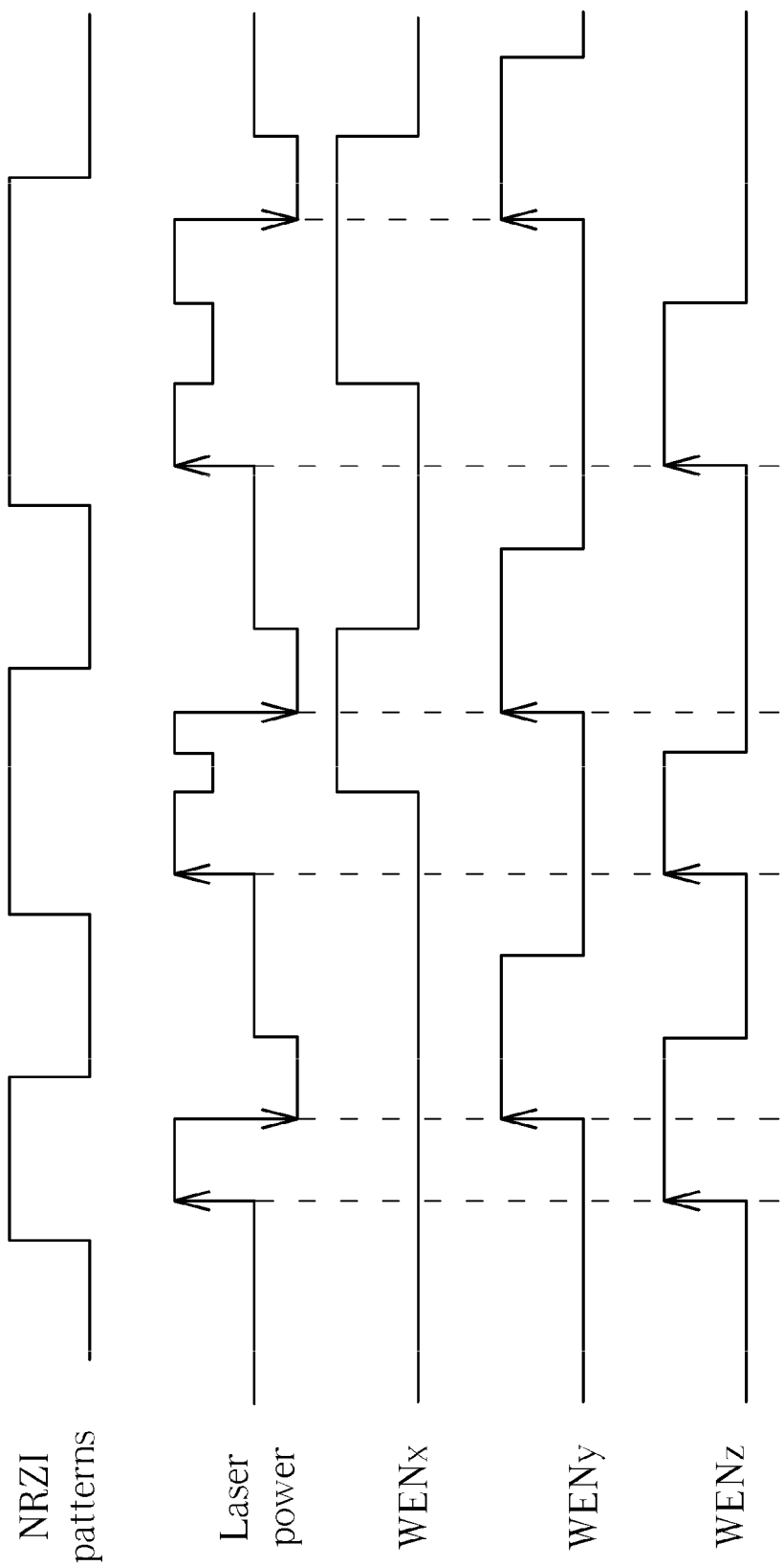
FIG. 9 is a diagram illustrating a third exemplary design of setting control signals for critical power transitions required by recording of different marks that are identified as critical patterns.

Please note that, in above examples shown in FIGS. 3-8, the critical patterns are 2T and 3T marks, and the logic transitions occur at the same control signal WENy transmitted via the same transmission line 106_2. However, this is for illustrative purposes only, and is not meant to be a limitation of the present invention. For example, FIG. 9 illustrates a third exemplary design of setting control signals WENx, WENy, and WENz for critical power transitions required by recording of different marks that are identified as critical patterns. The same objective of mitigating/avoiding the non-ideal effects present at the controller 102, the OPU 104, and/or the interface between the controller 102 and OPU 104 is achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling an optical pick-up unit to record a first mark with a first length and a second mark with a second length onto an optical storage medium, comprising:

checking if recording of the first mark requires a power transition from a first laser power level to a second laser power level and checking if recording of the second mark requires a power transition from a third laser power level to a fourth laser power level;

when the recording of the first mark requires the power transition from the first laser power level to the second laser power level, making a specific control signal transmitted to the optical pick-up unit have a logic transition from a low logic value to a high logic value and other control signals have no logic transition; and when the recording of the second mark requires the power transition from the third laser power level to the fourth laser power level, making the specific control signal transmitted to the optical pick-up unit have the logic transition from the low logic value to the high logic value and other control signals have no logic transition;

wherein the first length and the second length include a shortest mark length and a second shortest mark length allowed by the optical medium.

2. The method of claim 1, wherein the second laser power level is higher than the first laser power level; the fourth laser power level is higher than the third laser power level; during the recording of the first mark, the power transition from the first laser power level to the second laser power level has a power difference greater than any other power transition from a lower laser power level to a higher laser power level; and during the recording of the second mark, the power transition from the third laser power level to the fourth laser power level has a power difference greater than any other power transition from a lower laser power level to a higher laser power level.

3. The method of claim 1, wherein the optical storage medium is recorded using a plurality of laser power levels including a highest laser power level and a lowest laser power level; the second laser power level is the highest laser power level firstly used after a latest lowest laser power level is used; and the fourth laser power level is the highest laser power level firstly used after the latest lowest laser power level is used.

4. The method of claim 1, wherein the second laser power level is lower than the first laser power level; the fourth laser power level is lower than the third laser power level; during the recording of the first mark, the power transition from the first laser power level to the second laser power level has a power difference greater than any other power transition from a higher laser power level to a lower laser power level; and during the recording of the second mark, the power transition from the third laser power level to the fourth laser power level has a power difference greater than any other power transition from a higher laser power level to a lower laser power level.

5. The method of claim 1, wherein the optical storage medium is recorded using a plurality of laser power levels including a highest laser power level and a lowest laser power level; the second laser power level is the lowest laser power level firstly used after a latest highest laser power level is used; and the fourth laser power level is the lowest laser power level firstly used after the latest highest laser power level is used.

6. A method for controlling an optical pick-up unit to record a first mark with a first length and a second mark with a second length onto an optical storage medium, comprising:

checking if recording of the first mark requires a power transition from a first laser power level to a second laser power level and checking if recording of the second mark requires a power transition from a third laser power level to a fourth laser power level;

when the recording of the first mark requires the power transition from the first laser power level to the second laser power level, making a specific control signal transmitted to the optical pick-up unit have a logic transition from a low logic value to a high logic value and other control signals have no logic transition; and when the recording of the second mark requires the power transition from the third laser power level to the fourth laser power level, making the specific control signal transmitted to the optical pick-up unit have the logic transition from the high logic value to the low logic value and other control signals have no logic transition;

wherein the first length and the second length include a shortest mark length and a second shortest mark length allowed by the optical storage medium.

7. The method of claim 6, wherein the second laser power level is higher than the first laser power level; the fourth laser power level is higher than the third laser power level; during the recording of the first mark, the power transition from the first laser power level to the second laser power level has a power difference greater than any other power transition from a lower laser power level to a higher laser power level; and during the recording of the second mark, the power transition from the third laser power level to the fourth laser power level has a power difference greater than any other power transition from a lower laser power level to a higher laser power level.

8. The method of claim 6, wherein the optical storage medium is recorded using a plurality of laser power levels including a highest laser power level and a lowest laser power level; the second laser power level is the highest laser power level firstly used after a latest lowest laser power level is used; and the fourth laser power level is the highest laser power level firstly used after the latest lowest laser power level is used.

9. The method of claim 6, wherein the second laser power level is lower than the first laser power level; the fourth laser power level is lower than the third laser power level; during the recording of the first mark, the power transition from the first laser power level to the second laser power level has a power difference greater than any other power transition from a higher laser power level to a lower laser power level; and during the recording of the second mark, the power transition from the third laser power level to the fourth laser power level has a power difference greater than any other power transition from a higher laser power level to a lower laser power level.

10. The method of claim 6, wherein the optical storage medium is recorded using a plurality of laser power levels including a highest laser power level and a lowest laser power level; the second laser power level is the lowest laser power level firstly used after a latest highest laser power level is used; and the fourth laser power level is the lowest laser power level firstly used after the latest highest laser power level is used.

11. A controller for controlling an optical pick-up unit to record a first mark with a first length and a second mark with a second length onto an optical storage medium, comprising:

a checking circuit, arranged for checking if recording of the first mark requires a power transition from a first laser power level to a second laser power level and checking if recording of the second mark requires a power transition from a third laser power level to a fourth laser power level; and a processing circuit, coupled to the checking circuit, the processing circuit arranged for making a specific control signal transmitted to the optical pick-up unit have a logic transition from a low logic value to a high logic value and other control signals transmitted to the optical pick-up unit have no logic transition when the checking circuit indicates that the recording of the first mark requires the power transition from the first laser power level to the second laser power level, and making the specific control signal transmitted to the optical pick-up unit have the logic transition from the low logic value to the high logic value and other control signals transmitted to the optical pick-up unit have no logic transition when the checking circuit indicates that the recording of the second mark requires the power transition from the third laser power level to the fourth laser power level;

wherein the first length and the second length include a shortest mark length and a second shortest mark allowed by the optical storage medium.

12. A controller for controlling an optical pick-up unit to record a first mark with a first length and a second mark with a second length onto an optical storage medium, comprising:
a checking circuit, arranged for checking if recording of the first mark requires a power transition from a first laser power level to a second laser power level, and checking if recording of the second mark requires a power transition from a third laser power level to a fourth laser power level; and
a processing circuit, coupled to the checking circuit, the processing circuit arranged for making a specific control signal transmitted to the optical pick-up unit have a logic transition from a low logic value to a high logic value and other control signals transmitted to the optical pick-up unit have no logic transition when the checking circuit indicates that the recording of the first mark requires the power transition from the first laser power level to the second laser power level, and making the specific control signal transmitted to the optical pick-up unit have the logic transition from the high logic value to the low logic value and other control signals transmitted to the optical pick-up unit have no logic transition when the checking circuit indicates that the recording of the second mark requires the power transition from the third laser power level to the fourth laser power level;
wherein the first length and the second length include a shortest mark length and a second shortest mark length allowed by the optical storage medium.

13. A method for controlling an optical pick-up unit to record a first mark with a first length and a second mark with a second length onto an optical storage medium, comprising:
checking if recording of the first mark requires a power transition from a first laser power level to a second laser power level and checking if recording of the second mark requires a power transition from a third laser power level to a fourth laser power level;
when the recording of the first mark requires the power transition from the first laser power level to the second laser power level, making a specific control signal transmitted to the optical pick-up unit have a logic transition from a low logic value to a high logic value and other control signals have no logic transition; and
when the recording of the second mark requires the power transition from the third laser power level to the fourth laser power level, making the specific control signal transmitted to the optical pick-up unit have the logic transition from the low logic value to the high logic value and other control signals have no logic transition;
wherein the second laser power level is lower than the first laser power level; the fourth laser power level is lower than the third laser power level; during the recording of the first mark, the power transition from the first laser power level to the second laser power level has a power difference greater than any other power transition from a higher laser power level to a lower laser power level; and during the recording of the second mark, the power transition from the third laser power level to the fourth laser power level has a power difference greater than any other power transition from a higher laser power level to a lower laser power level.

14. A method for controlling an optical pick-up unit to record a first mark with a first length and a second mark with a second length onto an optical storage medium, comprising:
checking if recording of the first mark requires a power transition from a first laser power level to a second laser power level and checking if recording of the second mark requires a power transition from a third laser power level to a fourth laser power level;
when the recording of the first mark requires the power transition from the first laser power level to the second laser power level, making a specific control signal transmitted to the optical pick-up unit have a logic transition from a low logic value to a high logic value and other control signals have no logic transition; and
when the recording of the second mark requires the power transition from the third laser power level to the fourth laser power level, making the specific control signal transmitted to the optical pick-up unit have the logic transition from the low logic value to the high logic value and other control signals have no logic transition;
wherein the optical storage medium is recorded using a plurality of laser power levels including a highest laser power level and a lowest laser power level; the second laser power level is the lowest laser power level firstly used after a latest highest laser power level is used; and the fourth laser power level is the lowest laser power level firstly used after the latest highest laser power level is used.

15. A method for controlling an optical pick-up unit to record a first mark with a first length and a second mark with a second length onto an optical storage medium, comprising:
checking if recording of the first mark requires a power transition from a first laser power level to a second laser power level and checking if recording of the second mark requires a power transition from a third laser power level to a fourth laser power level;
when the recording of the first mark requires the power transition from the first laser power level to the second laser power level, making a specific control signal transmitted to the optical pick-up unit have a logic transition from a low logic value to a high logic value and other control signals have no logic transition; and
when the recording of the second mark requires the power transition from the third laser power level to the fourth laser power level, making the specific control signal transmitted to the optical pick-up unit have a logic transition from the high logic value to the low logic value and other control signals have no logic transition;
wherein the second laser power level is higher than the first laser power level; the fourth laser power level is higher than the third laser power level; during the recording of the first mark, the power transition from the first laser power level to the second laser power level has a power difference greater than any other power transition from a lower laser power level to a higher laser power level; and during the recording of the second mark, the power transition from the third laser power level to the fourth laser power level has a power difference greater than any other power transition from a lower laser power level to a higher laser power level.

16. A method for controlling an optical pick-up unit to record a first mark with a first length and a second mark with a second length onto an optical storage medium, comprising:

checking if recording of the first mark requires a power transition from a first laser power level to a second laser power level and checking if recording of the second mark requires a power transition from a third laser power level to a fourth laser power level;

when the recording of the first mark requires the power transition from the first laser power level to the second laser power level, making a specific control signal transmitted to the optical pick-up unit have a logic transition from a low logic value to a high logic value and other control signals have no logic transition; and when the recording of the second mark requires the power transition from the third laser power level to the fourth laser power level, making the specific control signal transmitted to the optical pick-up unit have a logic transition from the high logic value to the low logic value and other control signals have no logic transition;

wherein the optical storage medium is recorded using a plurality of laser power levels including a highest laser power level and a lowest laser power level; the second laser power level is the highest laser power level firstly used after a latest lowest laser power level is used; and the fourth laser power level is the highest laser power level firstly used after the latest lowest laser power level is used.

17. A method for controlling an optical pick-up unit to record a first mark with a first length and a second mark with a second length onto an optical storage medium, comprising:

checking if recording of the first mark requires a power transition from a first laser power level to a second laser power level and checking if recording of the second mark requires a power transition from a third laser power level to a fourth laser power level;

when the recording of the first mark requires the power transition from the first laser power level to the second laser power level, making a specific control signal transmitted to the optical pick-up unit have a logic transition from a low logic value to a high logic value and other control signals have no logic transition; and when the recording of the second mark requires the power transition from the third laser power level to the fourth laser power level, making the specific control signal transmitted to the optical pick-up unit have a logic transition from the high logic value to the low logic value and other control signals have no logic transition;

wherein the second laser power level is lower than the first laser power level; the fourth laser power level is lower than the third laser power level; during the recording of the first mark, the power transition from the first laser power level to the second laser power level has a power difference greater than any other power transition from a higher laser power level to a lower laser power level; and during the recording of the second mark, the power transition from the third laser power level to the fourth laser power level has a power difference greater than any other power transition from a higher laser power level to a lower laser power level.

18. A method for controlling an optical pick-up unit to record a first mark with a first length and a second mark with a second length onto an optical storage medium, comprising:

checking if recording of the first mark requires a power transition from a first laser power level to a second laser power level and checking if recording of the second mark requires a power transition from a third laser power level to a fourth laser power level;

when the recording of the first mark requires the power transition from the first laser power level to the second laser power level, making a specific control signal transmitted to the optical pick-up unit have a logic transition from a low logic value to a high logic value and other control signals have no logic transition; and when the recording of the second mark requires the power transition from the third laser power level to the fourth laser power level, making the specific control signal transmitted to the optical pick-up unit have a logic transition from the high logic value to the low logic value and other control signals have no logic transition;

wherein the optical storage medium is recorded using a plurality of laser power levels including a highest laser power level and a lowest laser power level; the second laser power level is the lowest laser power level firstly used after a latest highest laser power level is used; and the fourth laser power level is the lowest laser power level firstly used after the latest highest laser power level is used.

* * * * *